United States Patent
Kobori

(10) Patent No.: US 12,348,852 B2
(45) Date of Patent: Jul. 1, 2025

(54) PERSON IDENTIFICATION METHOD, PERSON IDENTIFICATION SYSTEM, AND COMPUTER READABLE MEDIUM

(71) Applicant: TOYOTA JIDOSHA KABUSHIKI KAISHA, Toyota (JP)

(72) Inventor: Norimasa Kobori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 175 days.

(21) Appl. No.: 18/166,579

(22) Filed: Feb. 9, 2023

(65) Prior Publication Data
US 2023/0300445 A1 Sep. 21, 2023

(30) Foreign Application Priority Data
Mar. 15, 2022 (JP) .................. 2022-040152

(51) Int. Cl.
*H04N 23/611* (2023.01)
*H04N 23/661* (2023.01)
*H04W 4/38* (2018.01)

(52) U.S. Cl.
CPC ......... *H04N 23/611* (2023.01); *H04N 23/661* (2023.01); *H04W 4/38* (2018.02)

(58) Field of Classification Search
CPC .............................. H04N 23/611; H04W 4/38
USPC .................................................. 348/207.99
See application file for complete search history.

(56) References Cited

U.S. PATENT DOCUMENTS

| | | | |
|---|---|---|---|
| 2003/0118216 A1* | 6/2003 | Goldberg | H04N 1/00137 707/E17.026 |
| 2020/0380280 A1 | 12/2020 | Kaede | |
| 2022/0189046 A1* | 6/2022 | Mochizuki | G06V 40/172 |
| 2023/0232106 A1* | 7/2023 | Hwang | H04N 23/75 348/262 |

FOREIGN PATENT DOCUMENTS

| | | |
|---|---|---|
| JP | 2009-193549 A | 8/2009 |
| JP | 2012-008802 A | 1/2012 |
| JP | 2016-122300 A | 7/2016 |
| JP | 2016-197290 A | 11/2016 |
| JP | 2020-194295 A | 12/2020 |

\* cited by examiner

*Primary Examiner* — Anthony J Daniels
(74) *Attorney, Agent, or Firm* — Oliff PLC

(57) ABSTRACT

In the first identification processing, recognition information on a person included in an image of a first range captured by a first camera is collated with user information included in antenna information on an antenna corresponding to the first camera. When the recognition information and the user information match each other at the position and the time, the person included in the image of the first range is identified as the user, and tracking support information on the user is generated. In the second identification processing, recognition information on a person included in an image of a second range captured by a second camera is compared with the tracking support information on the first camera corresponding to the second camera, and it is determined whether the same user as the user determined to be included in the image of the first range is included in the second range.

9 Claims, 8 Drawing Sheets

PERSON IDENTIFICATION METHOD, PERSON IDENTIFICATION SYSTEM, AND COMPUTER READABLE MEDIUM

The present disclosure claims priority under 35 U.S.C. § 119 to Japanese Patent Application No. 2022-040152, filed on Mar. 15, 2022, the content of which application is incorporated herein by reference in their entirety.

TECHNICAL FIELD

The present disclosure relates to a method, a system, and a computer readable medium for identifying a person included in a camera image by combining the camera image and communication.

BACKGROUND

JP2016-122300A discloses a system in which a person included in a camera image is identified by combining the camera image and communication. This conventional system includes a beacon device that is installed near an imaging device (a camera) and is configured to transmit a detection signal to a mobile terminal of a user, and an image processing device that is configured to execute identification processing of a person. When the detection signal is received from the beacon device, the mobile terminal of the user transmits the identification information of the beacon device and the user information to the image processing device. The user information includes identification information given to the user, feature information such as a face image of the user, or a combination of these pieces of information.

In the identification processing executed by the image processing device, it is predicted that the user exists within the angle of view of the camera installed in a vicinity of the beacon device based on the identification information of the beacon device and time information at which the user information is acquired. In the identification processing, a person is extracted from the camera image by a recognition process using the camera image acquired by the camera and time information at which the user information is acquired. Then, the extracted feature information of the person is collated with the feature information included in the user information, whereby the user included in the camera image is specified.

Consider a case where the beacon device in the conventional system is replaced with an antenna capable of transmitting and receiving data. In this case, for example, the antenna acquires user information by short-range wireless communication with the mobile terminal, and transmits the user information to an external device (e.g., an image processing device) by long-range communication. According to a system including such an antenna, similarly to a conventional system, it is possible to identify a person included in a camera image by combining the camera image and communication.

Here, an increase in the number of the cameras to be installed in the system is desirable from aspects such as watching a person included in a camera image and crime prevention using the camera image. In addition, if the number of the installed antennas increases, it is expected that an accuracy of position information of a mobile terminal (i.e., a user) increases and the accuracy of the identification of the person included in the camera image improves. On the other hand, an increase in the number of antennas to be installed is a concern in terms of cost increase. Therefore, it is desired to develop a technique to identify a person included in a camera image even in when total number of the installed antennas is smaller than that of installed cameras.

An object of the present disclosure is to provide a technique capable of identifying a person included in a camera image even when the total number of the installed antennas transmitting and receiving user information is smaller than that of installed cameras.

SUMMARY

A first aspect is a method to identify a person included in a camera image, and has the following features.

The method comprising the steps of:
  acquiring user information assigned to a user terminal through short-range wireless communication using an antenna, and transmitting the user information to an outside through long-range communication using the antenna;
  acquiring an image of a first range including at least a part of a range of the short-range wireless communication by the antenna by using a first camera;
  acquiring an image of a second range that does not include the range of the short-range wireless communication using a second camera;
  identifying a person included in the image of first range; and
  identifying a person included in the image of second range.

The step of identifying the person included in the image of the first range includes the steps of:
  generating recognition information on the person included in the image of the first range;
  determining whether a user associated with the user terminal is included in the image of the first range based on the recognition information on the person included in the image of the first range, the identification information on the antenna, and the user information acquired by the antenna; and when it is determined that the user associated with the user terminal is included in the image of the first range, generating tracking support information on the user.

The step of identifying the person included in the image of the second range includes the steps of:
  generating recognition information on the person included in the image of the second range; and
  determining whether the same user as the user determined to be included in the image of the first range is included in the image of the second range based on the recognition information on the person included in the image of the second range and the tracking support information.

The second aspect further has the following feature in the first aspect.

The tracking support information includes user information on the user determined to be included in the image of the first range, information on a position of the first camera by which the image of the first range has been acquired, and information on a time at which the image of the first range is acquired by the first camera.

The step of identifying the person included in the image of the second range further including the step of:
  narrowing down the tracking support information based on the information on the time at which the image of the first range included in the tracking support information is acquired, the information on the position of the first camera by which the image of the first range has been acquired included in the tracking support information, the information on the time at which the image of the second range is acquired, and the information on the position of the second camera.

The step of narrowing down the tracking support information includes a step of extracting tracking support information generated based on the image of the first range acquired by the first camera located within a predetermined distance from the position of the second camera in a period preceding by a predetermined time from the time at which the image of the second range is acquired.

A third aspect further has the following feature in the first aspect.

The second camera includes at least two cameras.

The step of identifying the person included in the image of the second range further includes the steps of:
  generating tracking confirmation information on the user when it is determined that the same user as the user determined to be included in the image of the first range is included in the image of the second range, the tracking confirmation information including user information on the user determined to be included in the image of the second range, the information on the position of the second camera by which the image of the second range has been acquired, and the information on the time at which the image of the second range is acquired by the second camera; and
  narrowing down the tracking confirmation information based on the information on the time at which the image of the second range included in the tracking confirmation information is acquired, the information on the position of the second camera included in the tracking confirmation information, the information on the time at which the image of the second range to be subjected to person identification is acquired, and the information on the position of the second camera by which the image of the second range to be subjected to person identification has been acquired.

The step of narrowing down the tracking support information includes a step of extracting tracking confirmation information generated based on the image of the second range acquired by another second camera located within a predetermined distance from the position of the second camera by which the image of the second range to be subjected to person identification in a period preceding by a predetermined time from the time at which the image of the second range to be subjected to the person identification is acquired.

A fourth aspect further has the following feature in the first aspect.

The first camera includes at least two cameras.

The method further comprising the step of:
  when it is determined that the same user is included in at least two images among the images in the first range acquired by the at least two first cameras, calculating a moving direction of the user based on the information on each position of the first camera by which the at least two images have been acquired and the information on each time at which the at least two images are acquired.

The step of identifying the person included in the image of first range further includes the steps of:
  when it is determined that the user associated with the user terminal is included in the image of the first range, determining whether information on a moving direction of the user is calculated; and
  when it is determined that the information on the moving direction has been calculated, adding the identification information on the second camera located ahead of the first camera by which the image of the first range in the moving direction has been acquired to the tracking support information based on the information on the moving direction.

The step of identifying the person included in the image of the second range further includes the steps of:
  determining whether the identification information on the second camera located ahead in the moving direction is included in the tracking support information; and when it is determined that the identification information on the second camera located ahead in the moving direction is included in the tracking support information, narrowing down the person included in the image of the second range based on the identification information on the second camera.

A fifth aspect is a system to identify a person included in a camera image, and has the following features.

The system comprises an antenna, first and second cameras, and a management server.

The antenna is configured to acquire user information assigned to a user terminal through short-range wireless communication and also is configured to transmit the user information to an outside through long-range communication.

The first camera is configured to capture a first range including at least a part of a range of short-range wireless communication by the antenna.

The second camera is configured to capture an image of a second range that does not include the range of the short-range wireless communication.

The management server is configured to execute a first identification processing to identify a person included in the image of the first range and a second identification processing to identify a person included in the image of the second range.

In the first identification processing, the management server is configured to:
  generate recognition information on a person included in the image of the first range;
  determine whether the user associated with the user terminal is included in the image of the first range based on the recognition information on the person included in the image of the first range, identification information on the antenna, and the user information acquired by the antenna; and
  when it is determined that the user associated with the user terminal is included in the image of the first range, generate tracking support information on the user.

In the second identification processing, the management server is configured to:
  generate recognition information on the person included in the image of the second range; and
  determine whether the same user as the user determined to be included in the image of the first range is included in the image of the second range based on the recognition information on the person included in the image of the second range and the tracking support information.

A sixth aspect further has the following feature in the fifth aspect.

The tracking support information includes user information on the user determined to be included in the image of the first range, information on a position of the first camera by which the image of the first range has been acquired, and information on a time at which the image of the first range is acquired by the first camera.

In the second identification processing, the management server is further configured to:
execute a narrowing processing of the tracking support information based on the information on the time at which the image of the first range included in the tracking support information is acquired, the information on the position of the first camera by which the image of the first range included in the tracking support information has been acquired, the information on the time at which the image of the second range is acquired, and the information on the position of the second camera.

In the tracking support information narrowing processing, the management server is configured to:
extract tracking support information generated based on the image of the first range acquired by the first camera located within a predetermined distance from the position of the second camera in a period preceding by a predetermined time from the time at which the image of the second range is acquired.

A seventh aspect has the following feature in addition to the fifth aspect.

The second camera includes at least two cameras.

In the second identification processing, the management server is further configured to:
generate tracking confirmation information on the user when it is determined that the same user as the user determined to be included in the image of first range is included in the image of second range.

The tracking confirmation information includes user information on the user determined to be included in the image of the second range, the information on the position of the second camera by which the image of the second range has been acquired, and the information on the time at which the image of the second range is acquired by the second camera.

In the second identification processing, the management server is further configured to:
execute a narrowing down processing of the tracking confirmation information based on the information on the time at which the image of the second range included in the tracking confirmation information is acquired, the information on the position of the second camera included in the tracking confirmation information, the information on the time at which the image of the second range to be subjected to person identification is acquired, and the information on the position of the second camera by which the image of the second range to be subjected to person identification has been acquired.

In the narrowing down processing, the management server is configured to:
extract tracking confirmation information generated based on the image of the second range acquired by another second camera located within a predetermined distance from the position of the second camera by which the image of the second range to be subjected to person identification in a period preceding by a predetermined time from the time at which the image of the second range to be subjected to the person identification is acquired.

An eighth aspect further has the following feature in the fifth aspect.

The first camera includes at least two cameras.

The management server is further configured to:
when it is determined that the same user is included in at least two images among the images in the first range acquired by the at least two first cameras, calculate a moving direction of the user based on the information on each position of the first camera by which the at least two images have been acquired and the information on each time at which the at least two images are acquired.

In the first identification processing, the management server is further configured to:
when it is determined that the user associated with the user terminal is included in the image of the first range, determine whether information on a moving direction of the user is calculated; and when it is determined that the information on the moving direction has been calculated, add the identification information on the second camera located ahead of the first camera by which the image of the first range in the moving direction has been acquired to the tracking support information based on the information on the moving direction.

In the second identification processing, the management server is further configured to:
determine whether the identification information on the second camera located ahead in the moving direction is included in the tracking support information; and when it is determined that the identification information on the second camera located ahead in the moving direction is included in the tracking support information, narrow down the person included in the image of the second range based on the identification information on the second camera.

A ninth aspect is a non-transitory computer readable medium that is configured to cause a computer to execute process to identify a person included in a camera image, and has the following features.

The process includes:
acquiring user information assigned to a user terminal through short-range wireless communication using an antenna, and transmitting the user information to an outside through long-range communication using the antenna;

acquiring an image of a first range including at least a part of a range of the short-range wireless communication by the antenna by using a first camera;

acquiring an image of a second range that does not include the range of the short-range wireless communication using a second camera;

identifying a person included in the image of first range; and identifying a person included in the image of second range.

The processing to identify the person included in the image of the first range includes:
generating recognition information on the person included in the image of the first range;

determining whether a user associated with the user terminal is included in the image of the first range based on the recognition information on the person included in the image of the first range, the identification information on the antenna, and the user information acquired by the antenna; and when it is determined that the user associated with the user terminal is included in the image of the first range, generating tracking support information on the user.

The processing to identify the person included in the image of the second range includes:
generating recognition information on the person included in the image of the second range; and determining whether the same user as the user determined to be included in the image of the first range is included in the image of the second range based on the recognition information on the person included in the image of the second range and the tracking support information.

According to the first, fifth or eighth aspect, when it is determined that the user associated with the user terminal is included in the image of the first range in the identification processing (the first identification processing) of the person included in the image of the first range, the tracking support information on the user is generated. The tracking support information is used to determine whether the same user as the user determined to be included in the image of the first range is included in the image of the second range in the identification processing (the second identification processing) of the person included in the image of the second range. Therefore, even when the total number of the installed antennas is smaller than the total number of the installed cameras, it is possible to identify the user included in the second range. This contributes to efficient tracking of the user in an environment with limited infrastructure resources.

According to the second or sixth aspect, the tracking support information is narrowed down. Therefore, it is possible to reduce processing load of a computer that executes the second identification processing. This contributes to more efficient tracking of the user.

According to the third or seventh aspect, when it is determined that the same user as the user determined to be included in the image of the first range is included in the image of the second range, the tracking confirmation information on the user is generated in the second identification processing. The tracking confirmation information is used for another second identification processing different from the second identification processing. Therefore, it is possible to keep track of this user by repeating the second identification processing and another second identification processing.

According to the fourth or eighth aspect, based on the moving direction of the user, the identification information on the second camera located ahead in the moving direction is added to the tracking support information. Therefore, it is possible to reduce the processing load of the computer that executes the second identification processing. This contributes to more efficient tracking of the user.

DESCRIPTION OF EMBODIMENT

Figure 1:
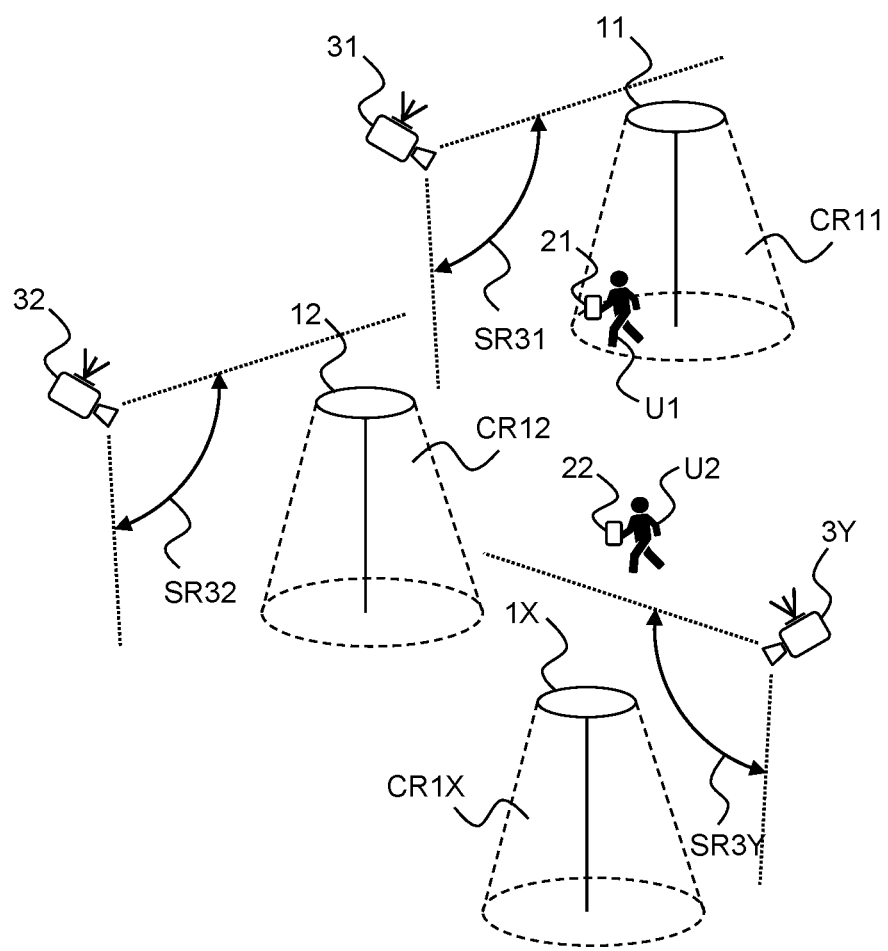
FIG. 1 is a diagram illustrating an outline of person identification executed in a system according to an embodiment of the present disclosure.

Hereinafter, a person identification method, a person identification system, and a non-transitory computer readable medium according to an embodiment of the present disclosure will be described with reference to the drawings. The person identification method according to the embodiment is realized by computer processing executed in the person identification system according to the embodiment. The non-transitory computer readable medium according to the embodiment stores a program for causing a computer to execute the person identification method according to the embodiment. In the drawings, the same or corresponding parts are denoted by the same reference numerals, and the description thereof will be simplified or omitted.

1. Outline of Embodiment 1-1. Person Identification

FIG. 1 is a diagram illustrating an outline of person identification executed in a system (hereinafter also simply referred to as a "system") according to an embodiment of the present disclosure. In the embodiment, the system includes at least two antennas. In FIG. 1, antennas 11 and 12 and 1X are illustrated as an example of at least two antennas. Hereinafter, when they are not particularly distinguished from each other, the antennas 11 and 12 and 1X are collectively referred to as an "antenna 1". The antenna 1 communicates with terminals (hereinafter also referred to as "user terminals") carried by users U of services (for example, person monitoring service and person tracing services) provided by the system according to the embodiment.

In FIG. 1, user terminals 21 and 22 are illustrated as examples of the user terminals. The user terminal 21 is a device carried by the user U1, and the user terminal 22 is a device carried by the user U2. Hereinafter, the user terminal 21 and the user terminal 22 are collectively referred to as a "user terminal 2". Communication with the user terminal 2 by the antenna 1 is performed by, for example, short-range wireless communication. Here, a communication system having a communication distance of several meters to several tens of meters is used for the short-range wireless communication. Specific examples of the communication method include Bluetooth (registered trademark) and Zigbee (registered trademark).

In the short-range wireless communication with the user terminal 2, the antenna 1 acquires information related to the user U (hereinafter also referred to as "user information"). Examples of the user information include identification information given to the user U. The identification information is set for each user terminal 2 by the system according to the embodiment, for example, when the service is used for the first time. The setting of the identification information on the user terminal 2 may be reset at a constant cycle (for example, every day). The user information also includes the distance from the antenna 1 to the user terminal 2 and information on the direction of the user terminal 2 with respect to the antenna 1 (i.e., information on the position of the user terminal 2).

The user information may include feature information such as a face image of the user U. The feature information is set by the user U, for example. The feature information may be set based on a result of person recognition executed by a management server (described later) during use of the service by the user U. In this case, for example, the feature information set based on the result of the person recognition is added to the user information held by the user terminal 2.

The antenna 1 also performs long-distance communication with a base station (not shown) on a network. Here, a communication system having a communication distance of several kilometers to several tens of kilometers is used for the long-distance communication. As a specific communication method, various types of low power wide area (LPWA), long term evolution (LTE), and the like are exemplified. The connection destination of the antenna 1 via the base station includes a management server (described later). A relay module such as Wi-Fi (registered trademark) may exist between the antenna 1 and the base station. The relay module may also be present between the base station and the management server.

In the long-distance communication with the base station, the antenna 1 transmits identification information on the antenna 1. Examples of the identification information on the antenna 1 include information on a position where the antenna 1 is installed and information on a range (CR11, CR12, and CR1X; hereinafter, when the ranges CR11, CR12, and CR1X are not particularly distinguished from each other, these ranges are collectively referred to as a "communication range CR1") of short-range wireless communication by the antenna 1. When the user information is acquired from the user terminal 2, the antenna 1 transmits the user information and information on a time at which the user information is acquired to the base station.

The identification information on the antenna 1, the user information acquired by the antenna 1, and the information on the time at which the user information is acquired are examples of information included in "antenna information ANT" (described later).

In the embodiment, the system also includes at least two cameras. In FIG. 1, cameras 31 and 32 and 3Y are illustrated as examples of at least two cameras. The camera 31 captures a range CR11 including at least a part of a communication range SR31 of the antenna 11. The camera 32 captures a range CR12 including at least a part of a communication range SR32 of the antenna 12. The camera 3Y captures a range 1X including at least a part of the communication range CR1X by the antenna SR3Y. Hereinafter, when the cameras 31, 32, and 3Y are not particularly distinguished from each other, they are collectively referred to as a "camera 3". Further, when the ranges SR31, SR32, and SR3Y are not particularly distinguished from each other, they are collectively referred to as an "shooting range SR3".

The camera 3 is attached to an indoor or outdoor construction to observe its surroundings. The photographing direction of the camera 3 may be fixed at one point, or the photographing direction may be moved in a horizontal direction or a vertical direction. The camera 3 also performs long-distance communication with a base station on the network. The same communication distance communication, the same communication system as that used by the antenna 1 is used. In the long-distance communication with the base station, the camera 3 transmits identification information on the camera 3 and image information acquired by the camera 3. Examples of the identification information on the camera 3 include information on a position where the camera 3 is installed. The image information acquired by the camera 3 is typically a moving image, but may be a still image. The image information acquired by the camera 3 includes information on the time at which the image information is acquired.

The identification information on the camera 3 and the image information acquired by the camera 3 are examples of information included in "camera information CAM1" (described later).

In the system according to the embodiment, a management server (described later) executes an "identification processing" to identify a person included in the image of the shooting range SR3. In the identification processing, for example, processing to recognize a person included in the image of the shooting range SR3 is executed. When a person included in the image of the shooting range SR3 is recognized, recognition information on the person is generated. Examples of the recognition information include information on the position of the recognized person. The recognition information may include feature information such as a face image of the recognized person. In the identification processing, it is determined whether the user U is included in the image of the shooting range SR3 based on the recognition information on the person included in the image of the shooting range SR3, the identification information on the antenna 1, and the user information acquired by the antenna 1.

1-2. Features of Identification Processing

Here, consider a case where the number of cameras 3 and antennas 1 to be installed increases. The increase in the number of the installed cameras 3 is desirable from the viewpoint of watching a person included in the image of the shooting range SR3, crime prevention using image information acquired by the camera 3, and the like. In addition, if the number of the installed antennas 1 increases, an accuracy of the position information on the user terminal 2 increases, and it is expected that the accuracy of identification of the person included in the image of the shooting range SR3 improves. On the other hand, an increase in the number of antennas 1 to be installed is a concern in terms of cost increase.

Therefore, in the embodiment, a situation in which the total number of the installed antennas 1 is smaller than that of the camera is considered. Here, the shooting range SR3 of the camera 3 includes at least a part of the communication range CR1 of the antenna 1. Therefore, in a situation where the total number of the installed antennas 1 is smaller than that of installed cameras, there is a camera that captures a range that does not include a communication range CR1.

Figure 2:
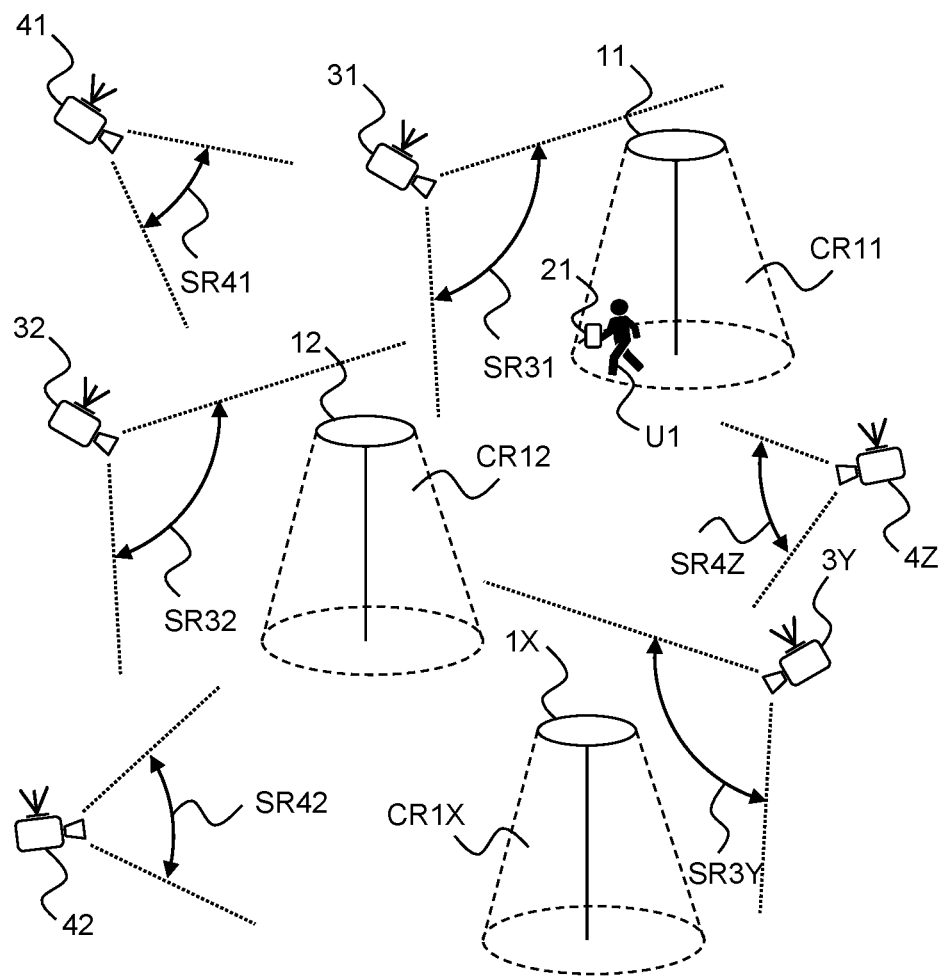
FIG. 2 is a diagram illustrating a situation assumed by the embodiment.

FIG. 2 is a diagram illustrating a situation assumed by the embodiment. FIG. 2 shows cameras 41 and 42 and 4Z in addition to the antennas 1 and the cameras 3 shown in FIG. 1. The cameras 41, 42, and 4Z are examples of cameras that capture images of the ranges SR41, 42, and 4Z that do not include the communication range CR1. The basic configurations of the cameras 41 and 42 and the 4Z are the same as those of the cameras 3. Hereinafter, when the cameras 41 and 42 and the 4Z are not particularly distinguished from each other, they are collectively referred to as a "camera 4". Further, when the ranges SR41, SR42, and SR4Z are not particularly distinguished from each other, they are collectively referred to as "shooting range SR4".

In the long-distance communication with the base station, the camera 4 transmits identification information on the camera 4 and image information acquired by the camera 4. Examples of the identification information on the camera 4 include information on a position where the camera 4 is installed. The image information acquired by the camera 4 is typically a moving image, but may be a still image. The image information acquired by the camera 4 includes information on the time at which the image information is acquired.

The identification information on the camera 4 and the image information acquired by the camera 4 are examples of information included in a "camera informationCAM2" (described later).

In the embodiment, in the identification processing, identification of a person included in the image of the shooting range SR3 is executed in addition to identification of a person included in the image of the shooting range SR4. Hereinafter, for convenience of description, the processing to identify the former is also referred to as "first identification processing", and the latter is also referred to as "second identification processing". The outline of the first identification processing is as described above. In the first identification processing, "tracking support information" of the user U is further generated. The generation of the tracking assist information is executed when it is determined that the user U is included in the image of the shooting range SR3.

The tracing support information includes, for example, user information on the user U determined to be included in the image of the shooting range SR3 (to be specific, identification information and position information on the user terminal 2), identification information on the camera 3 that has acquired the image of the shooting range SR3, and information on the time at which the image is acquired. When the tracking support information is generated, the tracking support information is used in the second identification processing.

In the second identification processing, processing to recognize a person included in the image of the shooting range SR4 is executed. When a person included in the image of the shooting range SR4 is recognized, recognition information on the person is generated. Examples of the recognition information include information on the position of the recognized person. The recognition information may include feature information such as a face image of the recognized person. In the second identification processing, whether the user U is included in the image of the shooting range SR4 is determined based on the recognition information on the person included in the image of the shooting range SR4 and the tracing support information.

As described above, according to the system of the embodiment, the tracing support information generated in the first identification processing is used to identify the person included in the image of the shooting range SR4 in the second identification processing. Therefore, even when the total number of the installed antennas 1 is smaller than the total number of the installed cameras, it is possible to identify the user U included in the shooting range SR4. This contributes to efficient tracking of the user U in an environment where infrastructure resources are limited.

In the system according to the embodiment, "tracking confirmation information" of the user U may be generated in the second identification processing. The generation of "tracking assist information" is executed when it is determined that the user U is included in the image of the shooting range SR3. On the other hand, the generation of the "tracking confirmation information" is executed when it is determined that the user U is included in the image of the shooting range SR4. The tracking confirmation information includes, for example, user information on the user U determined to be included in the image of the shooting range SR4, identification information on the camera 4 that has acquired the image of the shooting range SR4, and information on a time at which the image is acquired. When the tracking confirmation information is generated, this tracking confirmation information is used in "another second identification processing".

The different second identification processing is a second identification processing executed on an image in an shooting range SR4 different from that of the second identification processing in which the trace confirmation information is generated or a second identification processing executed on an image in an shooting range SR common to that of the second identification processing in which the trace confirmation information is generated at a time different from that of the second identification processing in which the trace confirmation information is generated.

Hereinafter, a system according to an embodiment will be described in more detail.

Figure 3:
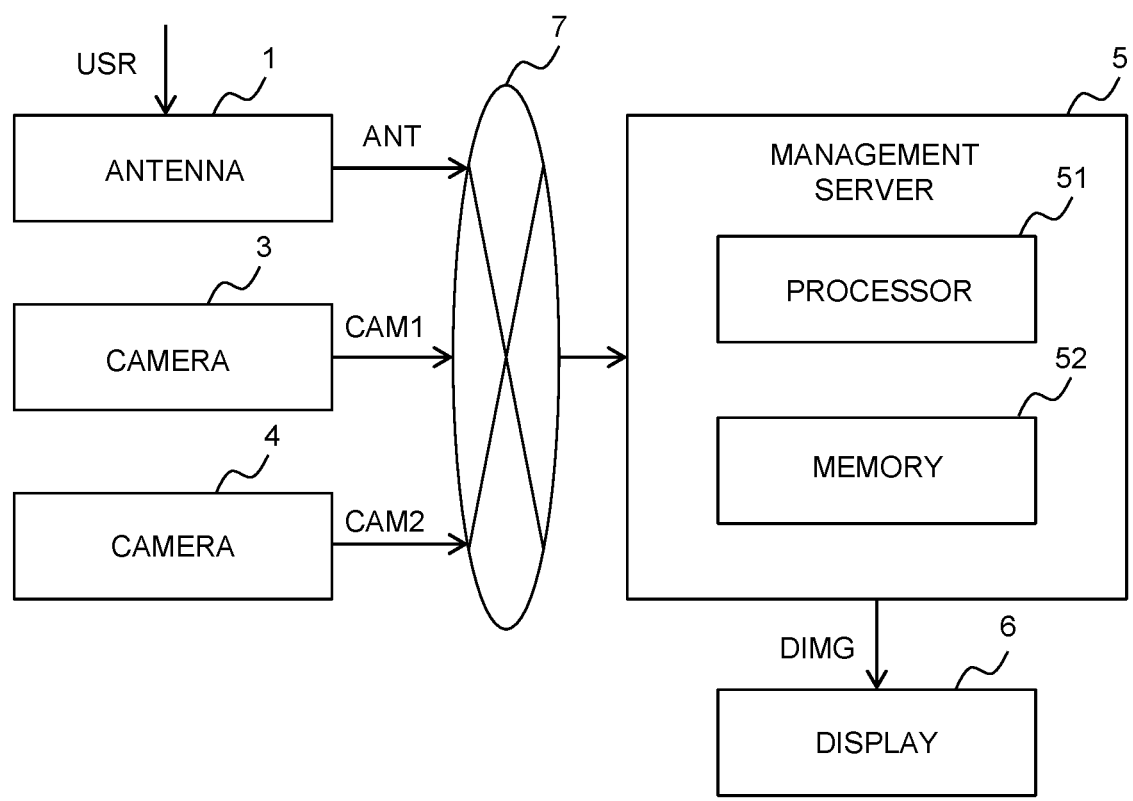
FIG. 3 is a block diagram illustrating an overall configuration example of a system according to the embodiment.

2. Configuration Example of Person Identification System 2-1. Overall Configuration Example FIG. 3 is a block diagram illustrating an example of the overall configuration of the system according to the embodiment. In the example illustrated in FIG. 3, the system according to the embodiment includes an antenna 1, cameras 3 and 4, a management server 5, and a display 6.

The antenna 1 is a communication device installed in an indoor or outdoor construction. The total number of the installed antennas 1 is at least two. The antenna 1 performs short-range wireless communication with the user terminal 2. For the short-range wireless communication, a communication system having a communication distance of several meters to several tens of meters is used. In short-range wireless communication, an antenna 1 acquires user information USR from a user terminal 2. The user information USR includes, for example, identification information on the user terminal 2, a distance from the antenna 1 to the user terminal 2, and information on a direction of the user terminal 2 with respect to the antenna 1. The user information USR may include feature information such as a face image of the user U.

The antenna 1 is also in long-distance communication with a management server 5 via a network 7. In the long-distance communication, a communication system having a communication distance of several kilometers to several tens of kilometers is used. In this long-distance communication, antenna 1 transmits antenna information ANT to the management server 5. The antenna information ANT includes, for example, identification information on the antenna 1. When the antenna 1 acquires the user information USR, the user information USR is added to the antenna information ANT.

The cameras 3 and 4 are observation devices attached to indoor or outdoor construction. The total number of the installed cameras 3 is at least two, and the total number of the installed cameras 4 is also at least two. The total number of the installed cameras 3 and 4 is greater than the total number of the installed antennas 1. The camera 3 captures a range including at least a part of the communication range CR1 by the antenna 1 (i.e., shooting range SR3). On the other hand, the camera 4 captures an image of a range not including the communication range CR1 (i.e., shooting range SR4).

The cameras 3 and 4 perform long-distance communication with the management server 5 via the network 7. In this long-distance communication, the camera 3 transmits the camera information CAM1 to the management server 5. The camera information CAM1 includes, for example, identification information on the camera 3 and image information acquired by the camera 3. On the other hand, the camera 4 transmits the camera informationCAM2 to the management server 5. The camera informationCAM2 includes, for example, identification information on the camera 4 and image information acquired by the camera 4.

Here, a correspondence relationship between the embodiment and aspects of the present disclosure will be described. The camera 3 corresponds to a "first camera" of an aspect of the present disclosure, and the camera 4 corresponds to a "second camera" of an aspect of the present disclosure. In addition, the shooting range SR3 corresponds to the "first range" of the aspect of the present disclosure, and the shooting range SR4 corresponds to the "second range" of the aspect of the present disclosure.

The management server 5 is a computer that manages a service provided by the system according to the embodiment. The management server 5 executes information processing based on various pieces of information (antenna information ANT, camera information CAM1, and CAM2) received from the antenna 1 and the cameras 3 and 4. As a configuration for executing information processing, the management server 5 includes at least one processor 51 and at least one memory 52. The processor 51 includes a central processing unit (CPU). The memory 52 is a volatile memory such as a DDR memory, and loads various programs used by the processor 51 and temporarily stores various information. Various pieces of information received by the management server 5 from the antenna 1 and the cameras 3 and 4 are stored in the memory 52.

The processor 51 executes various processes related to the first and second identification processing by executing the program for person identification stored in the memory 52. The processor 51 also executes display control for outputting the results of the first and second identification processing to the display 6.

The display 6 is a display device to which the image data DIMG generated by the display control is output. The display 6 is installed in a facility of a business operator that provides a service according to the embodiment. The display 6 is a display device of a terminal of a guardian of the user U who watches the user U. In the former case, it is connected to the management server 5 in a wired or wireless manner. In the latter case, the display 6 is connected to the management server 5 via the network 7. The total number of displays 6 is not particularly limited and is, for example, at least two in the former case and at least one in the latter case.

2-2. Functional Configuration Example of Management Server

Figure 4:
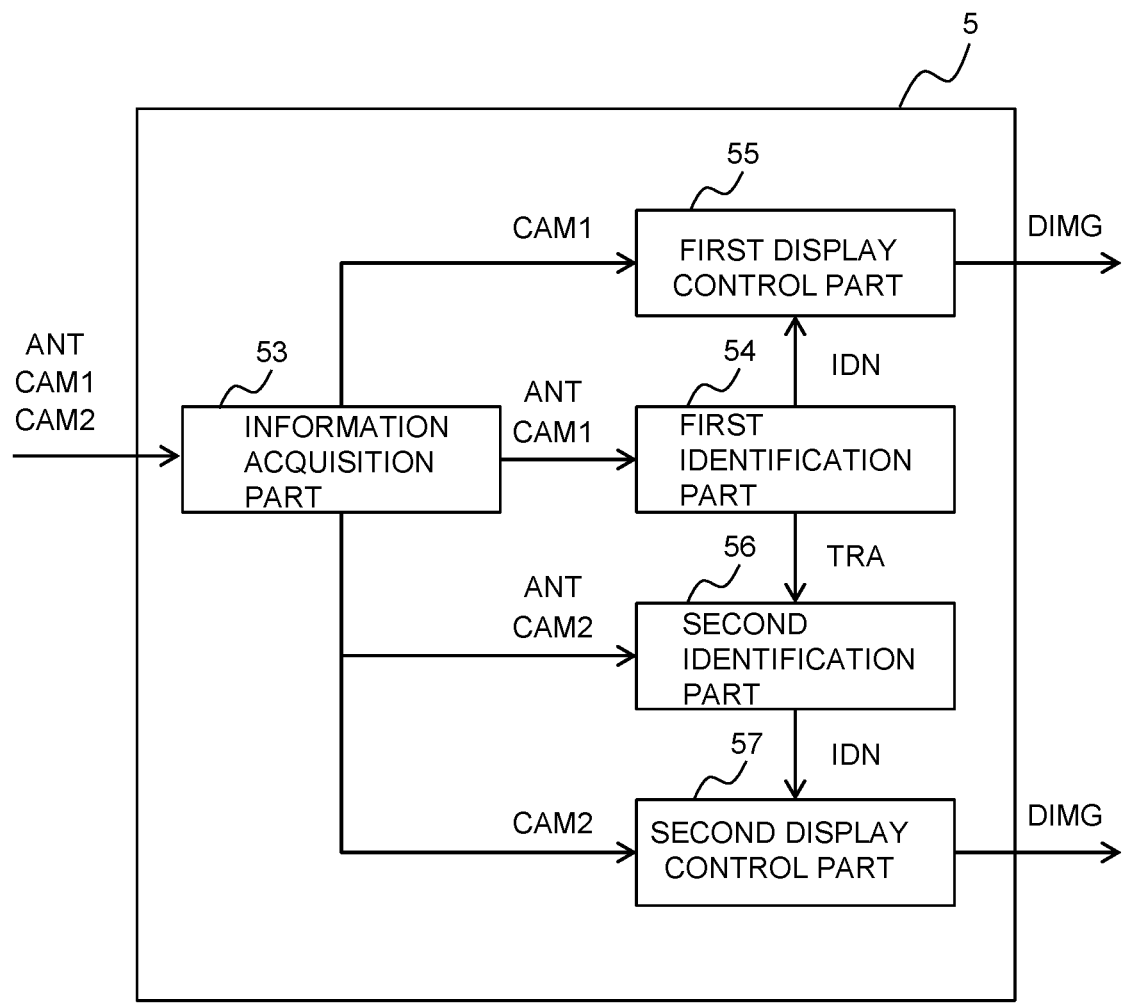
FIG. 4 is a block diagram illustrating a functional configuration example of the management server shown in FIG. 3.

FIG. 4 is a block diagram illustrating a functional configuration example of the management server 5 illustrated in FIG. 3. In the example illustrated in FIG. 4, the management server 5 includes an information acquisition part 53, a first identification part 54, a first display control part 55, a second identification part 56, and a second display control part 57. Each function of the blocks shown in FIG. 3 is realized by the processor 51 executing a predetermined program stored in the memory 52. Although one first identification part 54 and one first display control part 55 are illustrated in FIG. 4, these functions may be set according to the total number of cameras 3 installed. This also applies to the functions of the second identification part 56 and the second display control part 57.

2-2-1. Information Acquisition Part

The information acquisition part 53 acquires various information from the outside and stores it in the memory 52. The various types of information include antenna information ANT and camera information CAM1 and CAM2. The information acquisition part 53 also reads the various information stored in the memory 52. The information acquisition part 53 further transmits the antenna information ANT to the first identification part 54 and the second identification part 56, transmits the camera information CAM1 to the first identification part 54 and the first display control part 55, and transmits the camera information CAM2 to the second identification part 56 and the second display control part 57.

2-2-2. First Identification Part

The first identification part 54 executes a first identification processing. In the first identification processing, processing to recognize a person included in an image included in the camera information CAM1 (i.e., an image of the shooting range SR3) is executed. When a person included in the image of the shooting range SR3 is recognized, recognition information on the person is generated. Examples of the recognition information include information on the position of the recognized person. The recognition information may include feature information such as a face image of a recognized person.

In the first identification processing, the antenna information ANT of the antenna 1 corresponding to the camera 3 is acquired. The antenna 1 corresponding to the camera 3 is an antenna 1 whose communication range DR1 is partially included in the shooting range SR3. The antenna 1 corresponding to the camera 3 is specified based on, for example, information on a position where the camera 3 is installed, information on a position where the antenna 1 is installed, and information on a communication range CR1 of the antenna 1. The information on the position where the camera 3 is installed is acquired from the identification information on the camera 3. The information on the position where the antenna 1 is installed and the information on the communication range CR1 of the antenna 1 are acquired from the identification information on the antenna 1.

When the antenna information ANT of the antenna 1 corresponding to the camera 3 is acquired, the user information included in the antenna information ANT is collated with the recognition information on the person included in the image of the shooting range SR3. In this collation, for example, the user information USR (specifically, information on the position of the user terminal 2) acquired by the antenna 1 is compared with the information on the position of the recognized person. At the same time, the information on the time when the antenna 1 acquires the user information is compared with the information on the time when the image included in the camera information CAM1 is acquired. Then, when the user information and the recognition information coincide with each other in the position and the time, the recognized person is identified as the user U. In consideration of design errors of the antenna 1 and the camera 3, margins may be set for the position and the time.

When the user U is identified in the image of the shooting range SR3, identification information IDN is assigned to the recognized person in the first identification processing. The identification information IDN is set by the system according to the embodiment, and includes information different from the identification information on the user terminal 2. Note that assignment of the identification information IDN is not essential in the present disclosure, and other information that can associate the recognized person with the identification information on the user terminal 2 may be assigned to the recognized person. The identification information IDN is transmitted to the first display control part 55.

When the user U is identified in the image of the shooting range SR3, the tracing support information TRA is also generated in the first identification processing. The tracing support information TRA includes, for example, user information USR of the user U identified in the image of the shooting range SR3 (to be specific, identification information and position information on the user terminal 2), identification information on the camera 3 that has acquired the image of the shooting range SR3, and information on the time at which the image is acquired. The tracking support information TRA is transmitted to the second identification part 56.

2-2-3. First Display Control Part

The first display control part 55 executes ldisplay control. In the first display control, the image date DIMG is generated based on the image of the shooting range SR3 processed in the first identification processing by the first identification part 54, and is output to an external device (for example, the display 6). When the identification information IDN is assigned to the user U identified in the first identification processing, in the first display control, the identification information IDN is superimposed in the vicinity of the user U included in the image of the shooting range SR3.

2-2-4. Second Identification Part

The second identification part 56 executes a second identification processing. In the second identification processing, processing to recognize a person included in an image included in the camera information CAM2 (i.e., an image of the shooting range SR4) is executed. When a person included in the image of the shooting range SR4 is recognized, recognition information on the person is generated. Examples of the recognition information include information on the position of the recognized person. The recognition information may include feature information such as a face image of a recognized person.

In the second identification processing, the tracking support information TRA of the camera 3 corresponding to the camera 4 is acquired. Examples of the camera 3 corresponding to the camera 4 include a camera 3 installed around the camera 4. The camera 3 corresponding to the camera 4 is specified based on, for example, information on the position where the camera 4 is installed and that of the camera 3. The information on the positions where the cameras 3 and 4 are installed is acquired from the identification information on the cameras 3 and 4.

When the tracking assist information TRA of the camera 3 corresponding to the camera 4 is acquired, the information on the position of the camera 3 included in the tracking assist information TRA is compared with the information on the position of the camera 4. At the same time, the information on the time at which the camera 3 acquired the image of the shooting range SR3 is compared with the information on the time at which the camera 4 acquired the image of the shooting range SR4. In consideration of design errors of the cameras 3 and 4, margins may be set for the position and the time.

For example, when there is a camera 3 whose distance from the camera 4 is within a predetermined distance and which has acquired an image of the shooting range SR4 whose time difference from the time when the image of the shooting range SR3 is acquired to the time when the image of the shooting range SR3 is acquired is within a predetermined time, the person recognized in the image of the shooting range SR4 is identified as the user U included in the tracing support information TRA generated based on the image of the shooting range SR3. To increase the accuracy of the identification, the feature information on the person recognized in the image of the shooting range SR4 may be further compared with the feature information on the user U included in the tracing support information TRA.

When the user U is identified in the image of the shooting range SR4, identification information IDN is assigned to the recognized person in the second identification processing. As the identification information IDN, the identification information IDN received from the first identification part 54 may be added as it is, or the identification information IDN uniquely set in the image of the shooting range SR4 may be added. To efficiently track the user U, it is desirable that the identification information IDN received from the first identification part 54 is diverted. The identification information IDN is transmitted to the second display control part 57.

When the user U is identified in the image of the shooting range SR4, the follow-up confirmation information TRC may be generated in the second identification processing. The trace confirmation information TRC includes, for example, the user information USR of the user U identified in the image of the shooting range SR4 (to be specific, the identification information and the position information on the user terminal 2), the identification information on the camera 4 that has acquired the image of the shooting range SR4, and the information on the time when the image is acquired.

When the tracking confirmation information TRC is generated, in the second identification processing, information on the position of the camera 4 (hereinafter also referred to as a "comparison target camera") included in the tracking confirmation information TRC is compared with information on the position of the camera 4 (hereinafter also referred to as a "processing target camera") that has acquired the image of the shooting range SR4 that is the target of the second identification processing. At the same time, the information on the time at which the comparison target camera acquired the image of the shooting range SR4 is compared with the information on the time at which the processing target camera acquired the image of the shooting range SR4.

Then, for example, when there is a comparison target camera whose distance from the processing target camera is within a predetermined distance and whose time difference between the times at which the images of the shooting range SR4 are acquired is within a predetermined time, the person recognized in the image of the shooting range SR4 acquired by the processing target camera is identified as the user U included in the follow-up confirmation information TRC generated based on the person recognized by the comparison target camera. To increase the accuracy of the identification, the feature information on the person recognized in the image of the shooting range SR4 may be further compared with the feature information on the user U included in the follow-up confirmation information TRC.

2-2-5. Second Display Control Part

The second display control part 57 executes second display control. In the second display control, the image date DIMG is generated based on the image of the shooting range SR4 processed in the second identification processing by the second identification part 56, and is output to an external device (for example, the display 6). When the identification information IDN is assigned to the user U identified in the second identification processing, in the second display control, the identification information IDN is superimposed in the vicinity of the user U included in the image of the second shooting rangeSR4.

2-2-6. Another Example of Second Identification Part

Here, the second identification part 56 may narrow down the tracking support information TRA or the tracking confirmation information TRC used in the second identification processing. Hereinafter, an example of narrowing down will be described using tracking assist information TRA as a representative example.

Figure 5:
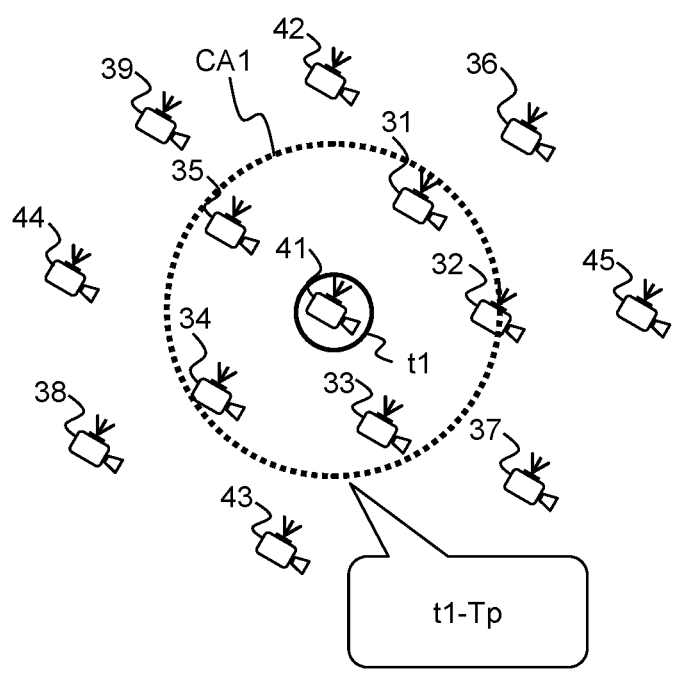
FIG. 5 is a diagram illustrating an example of narrowing down tracking support information used in a second identification processing.

FIG. 5 is a diagram illustrating an example of narrowing down the tracking support information TRA used in the second identification processing. In this narrowing-down example, attention is paid to the camera 41, and it is assumed that an image of shooting range SR41 is acquired at time t1. In this narrowing-down example, a past time (t4-Tp) going back from the time t1 by a predetermined time Tp is set. Then, a circle CA1 of Tp*V is set for a predetermined time with the position where the camera 41 is installed as the center (V is the moving speed of a general walker). Then, the cameras 3 (the cameras 31 to 35 in the example illustrated in FIG. 5) located inside the circle CA1 are specified.

In the example shown in FIG. 5, the trace assist information TRA generated based on the image of the shooting range SR3 of the camera 3 located inside the circle CA1 is extracted. In the example shown in FIG. 5, the trace assist information TRA generated based on the image of the shooting range SR3 acquired from the time (t1-Tp) to the time t1 is extracted.

2-2-7. Another Example of First and Second Identification Parts

As described above, the total number of cameras 3 installed is two. Therefore, a case where the same user U is identified in each image of the shooting range SR3 acquired by the two cameras 3 is assumed. In such a case, it is possible to predict the moving direction (the direction of the flow line) of the user based on the information on the positions of the two cameras 3 and the information on the times at which the images of the two types of shooting ranges SR3 are acquired by the cameras 3. The prediction of the movement direction is separately calculated by the processor 51.

In this example, consider the case where movement direction is being calculated. When the user U is identified in the image of the shooting range SR3, the first identification part 54 acquires information on the moving direction of the user U. Based on the information on the movement direction, the first identification part 54 specifies the camera 4 located ahead in the movement direction when viewed from the camera 3 that has acquired the image of the shooting range SR3. Then, the first identification part 54 adds the identification information on the camera 4 (e.g., information on the position where the camera 4 is installed) to the tracking support information TRA.

Figure 6:
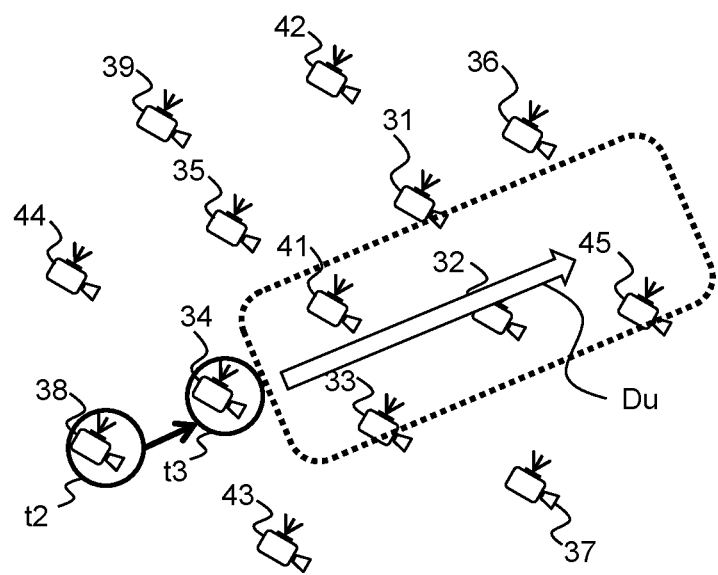
FIG. 6 is a diagram for explaining an example of a method of specifying a camera having identification information added to tracking support information.

FIG. 6 is a diagram illustrating an example of a method of specifying the camera 4 having the identification information added to the tracking support information TRA. In the example shown in FIG. 6, attention is paid to cameras 34 and 38. In the example illustrated in FIG. 6, it is also assumed that the image of the shooting range SR38 is acquired at the time t2 and the image of the shooting range SR34 is acquired at the time t2 after the time t3.

When the user U is identified as a result of the first identification processing based on the image of the shooting range SR34 acquired at the time t3, the first identification part 54 determines whether the moving direction Du of the user U is calculated. Then, when it is determined that the movement direction Du is calculated, the first identification part 54 specifies the cameras 4 (the cameras 41 and 45 in the example illustrated in FIG. 6) present ahead in the movement direction Du. When specifying the camera 4, narrowing down may be executed based on the moving speed V of a general walker, or narrowing down may be executed based on the moving speed Vu of the user U. The moving speed Vu can be calculated based on, for example, information on the positions of the cameras 34 and 38 and a time difference between the times t2 and t3.

As described above, the tracing support information TRA includes the user information USR of the user U identified in the image of the shooting range SR3. Therefore, by adding the identification information on the camera 4 present ahead in the moving direction Du to the trace support information TRA, the user U is easily identified in the second identification processing based on the image of the shooting range SR4 acquired by the camera 4.

When the tracking assist information TRA of the camera 3 corresponding to the camera 4 is acquired, the second identification part 56 determines whether the identification information on the processing target camera is included in the tracking assist information TRA. Then, when it is determined that the identification information on the processing target camera is included in the tracking assist information TRA, the person recognized in the image of the shooting range SR4 is narrowed down based on the identification information.

2-3. Processing Example Executed by the Management Server

Figure 7:
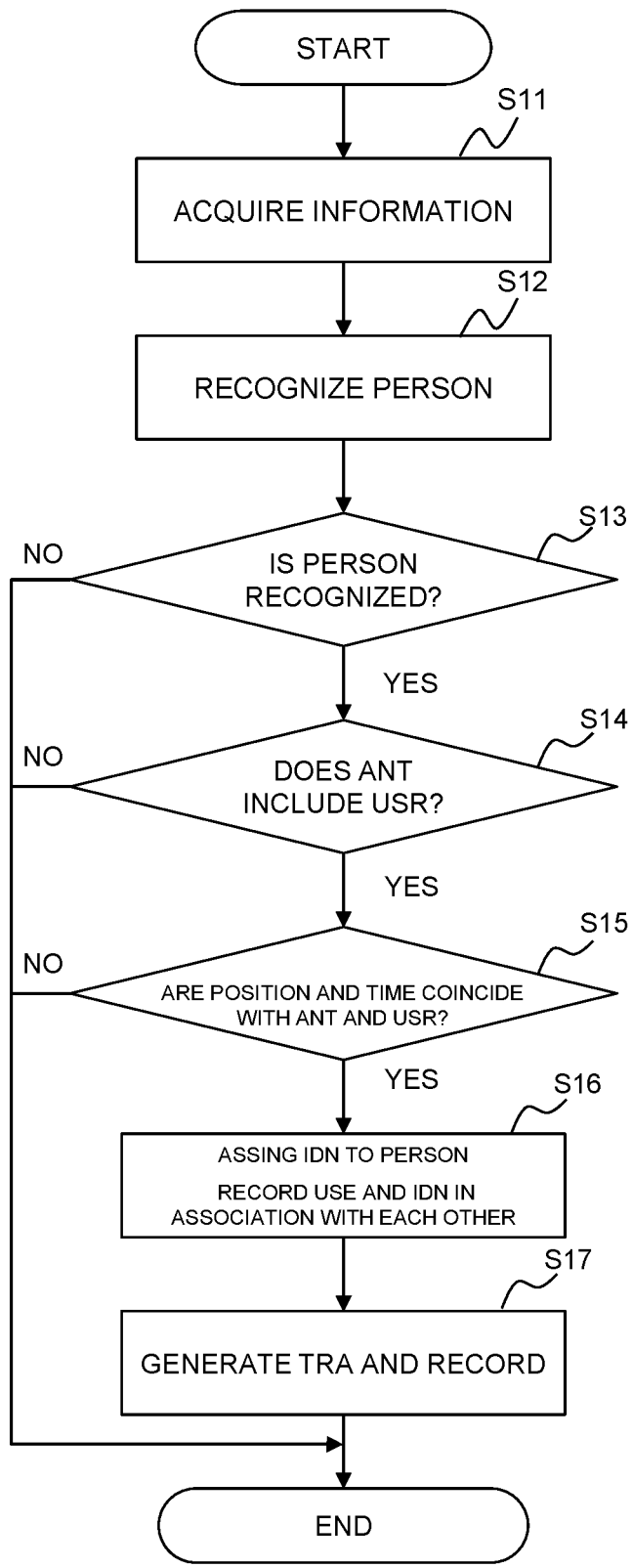
FIG. 7 is a flowchart illustrating an example of a flow of a first identification processing executed by the management server (a processor)

FIG. 7 is a flowchart illustrating an example of a flow of a first identification processing executed by the management server 5 (the processor 51). The processing routine shown in FIG. 7 is repeatedly executed at a predetermined cycle for each camera 3, for example.

In the routine shown in FIG. 7, first, information is acquired (step S11). In the processing of step S11, for example, antenna information ANT and camera information CAM1 are acquired. As described above, the antenna information ANT includes, for example, identification information (position information and information on the communication range CR1) of the antenna 1, user information USR (identification information on the user terminal 2) acquired by the antenna 1, and information on time when the user information USR is acquired. The camera information CAM1 includes, for example, identification information (position information) of the camera 3 and image information (an image of the shooting range SR3 and a time at which the image information is acquired) acquired by the camera 3.

Following the processing of step S11, a person included in the image of shooting range SR3 is recognized (step S12). In the processing of step S12, the position of a person included in the image of shooting range SR3 is recognized based on known image processing. When the position of a person included in the image of the shooting range SR3 is recognized, recognition information on the person is generated. In the processing of step S12, in addition to the recognition of the position of the person included in the image of the shooting range SR3, the feature of the person may be recognized. In this case, the feature information is added to the recognition information.

Following the processing of step S12, it is determined whether a person included in the image of the shooting range SR3 is recognized (step S13). the processing of step S13 is determined based on whether recognition information on a person is generated in step S12, for example. When the determination result of step S13 is negative, the first identification processing is ended. Otherwise, the process proceeds to step S14.

In the processing of step S14, it is determined whether the user information USR is included in the antenna information ANT of the antenna 1 corresponding to the camera 3. As described above, the antenna 1 corresponding to the camera 3 is an antenna 1 of which a part of the communication range DR1 is included in the shooting range SR3. When the determination result of step S14 is negative, the first identification processing is ended. Otherwise, the process proceeds to step S15.

In the processing of step S15, the recognition information generated in the processing of step S12 is compared with the user information USR. Specifically, the position of the person included in the recognition information is compared with the position of the user U included in the user information USR. At the same time, the time at which the image of the shooting range SR3 subjected to the processing in step S12 is acquired is compared with the time at which the user information USR is acquired. Then, in a case where the recognition information and the user information USR coincide with each other in the position and the time, the person included in the recognition information is identified as the user U. In consideration of design errors of the antenna 1 and the camera 3, margins may be set for the position and the time.

In the processing of step S15, when there is no user information USR that matches the recognition information, identification of the person included in the recognition information is not executed, and the first identification processing is ended. In this case, information indicating that the person included in the recognition information is not the user U may be added to the person.

When a person is identified in the processing of step S15, an identification information IDN is assigned to the person (step S16). As described above, the identification information IDN is arbitrary information set by the system according to the embodiment, and is configured by information different from the identification information on the user terminal 2. In the processing of step S16, user information USR and identification information IDN are associated with each other and recorded in a predetermined memory. Examples of the predetermined memory include a memory higher than the memory 52 such as a cache memory.

Following the processing of step S16, a tracking assist information TRA is generated (step S17). As described above, the tracing support information TRA includes, for example, the user information USR of the user U identified in the image of the shooting range SR3 (to be specific, the identification information and the position information on the user terminal 2), the identification information on the camera 3 that has acquired the image of the shooting range SR3, and the information on the time when the image is acquired. Further, in the processing of step S17, the generated tracking assist information TRA is recorded in a predetermined memory.

In the processing of step S17, the camera 4 present ahead in the moving direction Du may be specified based on the information on the moving direction Du described in FIG. 6. When the camera 4 is specified, the recognition information on the camera 4 may be added to the tracking support information TRA.

Figure 8:
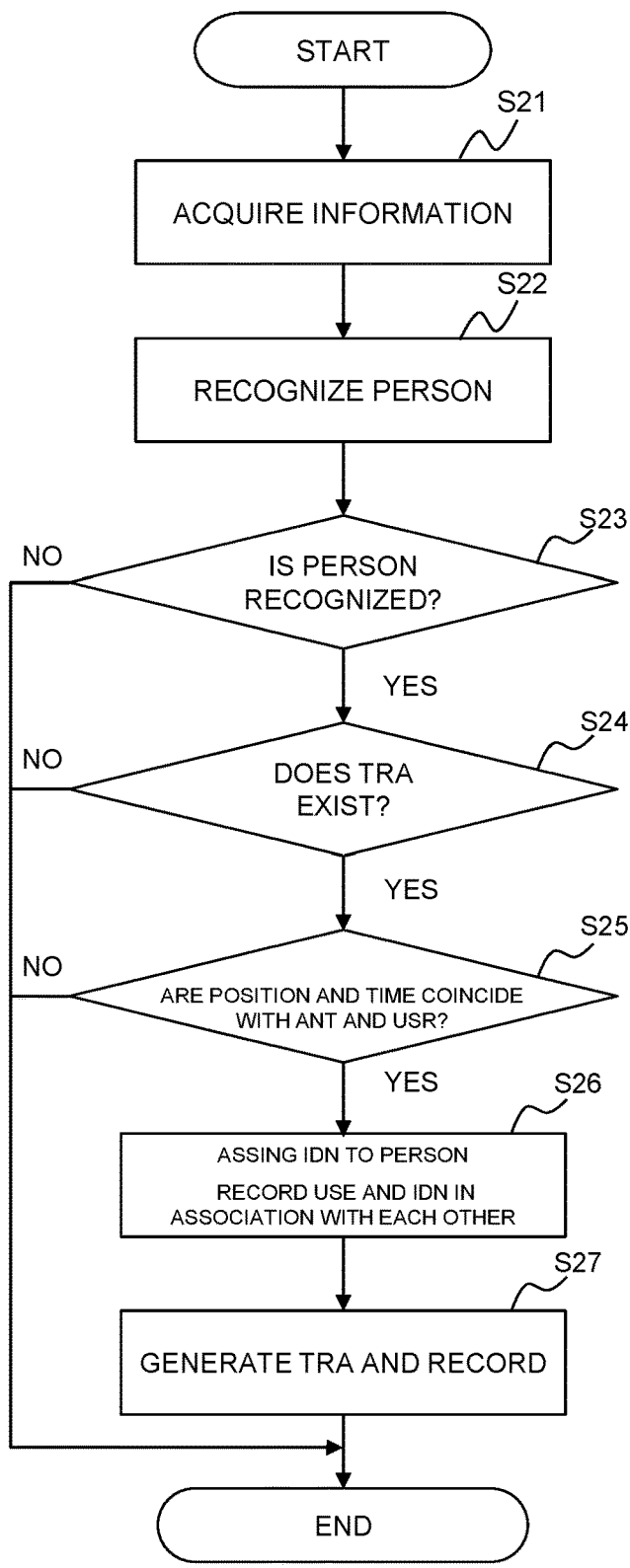
FIG. 8 is a flowchart illustrating an example of a flow of a second identification processing by the management server (a processor).

FIG. 8 is a flowchart illustrating an example of a flow of a second identification processing executed by the management server 5 (processor 51). The processing routine shown in FIG. 8 is repeatedly executed at a predetermined cycle for each camera 4, for example.

In the routine shown in FIG. 8, first, the processing of steps S21 to S23 is executed. The content of the processing at step S21 is the same as that at step S11 in FIG. 7, the content of the processing at step S22 is the same as that at step S12 in FIG. 7, and the content of the processing at step S23 is the same as that at step S13 in FIG. 7. When the determination result of step S23 is negative, the second identification processing is ended. Otherwise, the processing proceeds to step S24.

In the processing of step S24, it is determined whether there is a tracking assist information TRA of the camera 3 corresponding to the camera 4. As described above, the examples of the camera 3 corresponding to the camera 4 include the camera 3 installed around the camera 4. When the determination result of step S24 is negative, the second identification processing is ended. Otherwise, the processing proceeds to step S25.

In the processing of step S24, the tracing support information TRA described with reference to FIG. 5 may be narrowed down before determining whether the tracing support information TRA is present. In this case, for example, narrowing down is executed based on the information on the position where the camera 4 is installed, the information on the time when the image of the shooting range SR4 which is the target of the processing of step S22 is acquired, the information on the position where the camera 3 corresponding to the camera 4 is installed, and the information generated based on the image of the shooting range SR3 acquired by the camera 3 among the tracing support information TRA.

In the processing of step S25, the tracing support information TRA is compared with the identification information on the camera 4 and the information on the time at which the image of the shooting range S22 which is the target of the processing of step SR4 is acquired. To be more specific, the position of the camera 3 which has acquired the image of the shooting range SR3 included in the tracing support information TRA is compared with the position of the camera 4. At the same time, the time at which the image of the shooting range SR3 was acquired and the time at which the image of the shooting range SR4 was acquired are compared.

Then, for example, when there is a camera 3 whose distance from the camera 4 is within a predetermined distance and which has acquired an image of the shooting range SR4 whose time difference from the time when the image of the shooting range SR3 is acquired to the time when the image of the shooting range SR3 is acquired is within a predetermined time, the person recognized in the processing of step S22 is identified as the user U included in the tracing support information TRA.

In the processing of steps S24 and S25, the person included in the image of the shooting range SR4 may be identified based on the trace confirmation information TRC instead of the trace support information TRA. In this case, "camera 3" may be read as "comparison target camera" and "camera 4" may be read as "processing target camera" in the description of steps S24 and S25 described above.

In the processing of step S25, the identification information on the camera 4 included in the tracing support information TRA described with reference to FIG. 6 may be used to narrow down the person recognized in the image of the shooting range S22 as the target of step SR4.

When a person is identified in the processing of step S25, an identification information IDN is assigned to the person (step S26). The content of the processing of step S26 is the same as the processing of step S16 in FIG. 7.

Following the processing of step S26, a tracking confirmation information TRC is generated (step S27). As described above, the tracing support information TRA includes, for example, the user information on the user U determined to be included in the image of the shooting range SR4, the identification information on the camera 4 that has acquired the image of the shooting range SR4, and the information on the time at which the image is acquired. In the processing of step S27, the generated tracking confirmation information TRC is recorded in a predetermined memory.

3. Effect

According to the embodiment described above, when the user U is identified in the processing (first identification processing) to identify a person included in the image of the shooting range SR3, the tracing support information TRA is generated. Then, the tracing support information TRA is used for the processing (the second identification processing) to identify the person included in the image of the shooting range SR4. Therefore, even when the total number of the installed antennas 1 is smaller than the total number of the installed cameras, it is possible to identify the user U included in the shooting range SR4. This contributes to efficient tracking of the user U in an environment where infrastructure resources are limited.

According to the embodiment, in a case where the user U is identified in the processing (the second identification processing) to identify the person included in the image of the shooting range SR4, the trace confirmation information TRC may be generated, or the trace confirmation information TRC may be used in another second identification processing. In this case, once the user U is identified in the first identification processing, the user U can be continuously tracked by repeating the second identification processing and another second identification processing. This contributes to an improvement in service convenience.

In addition, according to the embodiment, narrowing down of the tracking support information TRA described in FIG. 5 or addition of the identification information on the camera 4 described in FIG. 6 to the tracking support information TRA may be executed. In this case, it is possible to reduce the processing load of the computer that executes the second identification processing. This contributes to more efficient tracking of the user U.

What is claimed is:

1. A method to identify a person included in a camera image, the method comprising the steps of:
   acquiring user information assigned to a user terminal through short-range wireless communication using an antenna, and transmitting the user information to an outside through long-range communication using the antenna;
   acquiring an image of a first range including at least a part of a range of the short-range wireless communication by the antenna by using a first camera;
   acquiring an image of a second range that does not include the range of the short-range wireless communication using a second camera;
   identifying a person included in the image of first range; and
   identifying a person included in the image of second range,
   wherein:
   the step of identifying the person included in the image of the first range includes the steps of:
      generating recognition information on the person included in the image of the first range;
      determining whether a user associated with the user terminal is included in the image of the first range based on the recognition information on the person included in the image of the first range, the identification information on the antenna, and the user information acquired by the antenna; and
      when it is determined that the user associated with the user terminal is included in the image of the first range, generating tracking support information on the user,
   the step of identifying the person included in the image of the second range includes the steps of:
      generating recognition information on the person included in the image of the second range; and
      determining whether the same user as the user determined to be included in the image of the first range is included in the image of the second range based on the recognition information on the person included in the image of the second range and the tracking support information, without using the user information acquired from the antenna.

2. The method according to claim 1,
   wherein the tracking support information includes user information on the user determined to be included in the image of the first range, information on a position of the first camera by which the image of the first range has been acquired, and information on a time at which the image of the first range is acquired by the first camera,
   wherein the step of identifying the person included in the image of the second range further includes the step of:
      narrowing down the tracking support information based on the information on the time at which the image of the first range included in the tracking support information is acquired, the information on the position of the first camera by which the image of the first range has been acquired included in the tracking support information, the information on the time at which the image of the second range is acquired, and the information on the position of the second camera,
   wherein the step of narrowing down the tracking support information includes a step of extracting tracking support information generated based on the image of the first range acquired by the first camera located within a predetermined distance from the position of the second camera in a period preceding by a predetermined time from the time at which the image of the second range is acquired.

3. The method according to claim 1,
wherein the second camera includes at least two cameras,
wherein the step of identifying the person included in the image of the second range further includes the steps of:
  generating tracking confirmation information on the user when it is determined that the same user as the user determined to be included in the image of the first range is included in the image of the second range, the tracking confirmation information including user information on the user determined to be included in the image of the second range, the information on the position of the second camera by which the image of the second range has been acquired, and the information on the time at which the image of the second range is acquired by the second camera; and
  narrowing down the tracking confirmation information based on the information on the time at which the image of the second range included in the tracking confirmation information is acquired, the information on the position of the second camera included in the tracking confirmation information, the information on the time at which the image of the second range to be subjected to person identification is acquired, and the information on the position of the second camera by which the image of the second range to be subjected to person identification has been acquired,
wherein the step of narrowing down the tracking support information includes a step of extracting tracking confirmation information generated based on the image of the second range acquired by another second camera located within a predetermined distance from the position of the second camera by which the image of the second range to be subjected to person identification in a period preceding by a predetermined time from the time at which the image of the second range to be subjected to the person identification is acquired.

4. The method according to claim 1,
wherein the first camera includes at least two cameras,
wherein the method further comprising the step of:
  when it is determined that the same user is included in at least two images among the images in the first range acquired by the at least two first cameras, calculating a moving direction of the user based on the information on each position of the first camera by which the at least two images have been acquired and the information on each time at which the at least two images are acquired,
wherein the step of identifying the person included in the image of first range further includes the steps of:
  when it is determined that the user associated with the user terminal is included in the image of the first range, determining whether information on a moving direction of the user is calculated; and
  when it is determined that the information on the moving direction has been calculated, adding the identification information on the second camera located ahead of the first camera by which the image of the first range in the moving direction has been acquired to the tracking support information based on the information on the moving direction,
wherein the step of identifying the person included in the image of the second range further includes the steps of:
  determining whether the identification information on the second camera located ahead in the moving direction is included in the tracking support information; and
  when it is determined that the identification information on the second camera located ahead in the moving direction is included in the tracking support information, narrowing down the person included in the image of the second range based on the identification information on the second camera.

5. A system to identify a person included in a camera image, comprising:
  an antenna configured to acquire user information assigned to a user terminal through short-range wireless communication and also configured to transmit the user information to an outside through long-range communication;
  a first camera configured to capture a first range including at least a part of a range of short-range wireless communication by the antenna;
  a second camera configured to capture an image of a second range that does not include the range of the short-range wireless communication; and
  a management server configured to execute a first identification processing to identify a person included in the image of the first range and a second identification processing to identify a person included in the image of the second range,
wherein, in the first identification processing, the management server is configured to:
  generate recognition information on a person included in the image of the first range;
  determine whether the user associated with the user terminal is included in the image of the first range based on the recognition information on the person included in the image of the first range, identification information on the antenna, and the user information acquired by the antenna; and
  when it is determined that the user associated with the user terminal is included in the image of the first range, generate tracking support information on the user,
wherein, in the second identification processing, the management server is configured to:
  generate recognition information on the person included in the image of the second range; and
  determine whether the same user as the user determined to be included in the image of the first range is included in the image of the second range based on the recognition information on the person included in the image of the second range and the tracking support information, without using the user information acquired from the antenna.

6. The system according to claim 5,
wherein the tracking support information includes user information on the user determined to be included in the image of the first range, information on a position of the first camera by which the image of the first range has been acquired, and information on a time at which the image of the first range is acquired by the first camera,
wherein, in the second identification processing, the management server is further configured to:
  execute a narrowing processing of the tracking support information based on the information on the time at which the image of the first range included in the tracking support information is acquired, the information on the position of the first camera by which the image of the first range included in the tracking support information has been acquired, the information on the time at which the image of the second range is acquired, and the information on the position of the second camera, wherein, in the tracking support information narrowing processing, the management server is configured to:
extract tracking support information generated based on the image of the first range acquired by the first camera located within a predetermined distance from the position of the second camera in a period preceding by a predetermined time from the time at which the image of the second range is acquired.

7. The system according to claim 5,
wherein the second camera includes at least two cameras,
wherein, in the second identification processing, the management server is further configured to:
generate tracking confirmation information on the user when it is determined that the same user as the user determined to be included in the image of first range is included in the image of second range, wherein the tracking confirmation information includes user information on the user determined to be included in the image of the second range, the information on the position of the second camera by which the image of the second range has been acquired, and the information on the time at which the image of the second range is acquired by the second camera wherein, in the second identification processing, the management server is further configured to:
execute a narrowing down processing of the tracking confirmation information based on the information on the time at which the image of the second range included in the tracking confirmation information is acquired, the information on the position of the second camera included in the tracking confirmation information, the information on the time at which the image of the second range to be subjected to person identification is acquired, and the information on the position of the second camera by which the image of the second range to be subjected to person identification has been acquired, wherein, in the narrowing down processing, the management server is configured to:
extract tracking confirmation information generated based on the image of the second range acquired by another second camera located within a predetermined distance from the position of the second camera by which the image of the second range to be subjected to person identification in a period preceding by a predetermined time from the time at which the image of the second range to be subjected to the person identification is acquired.

8. The system according to claim 5,
wherein the first camera includes at least two cameras,
wherein the management server is further configured to:
when it is determined that the same user is included in at least two images among the images in the first range acquired by the at least two first cameras, calculate a moving direction of the user based on the information on each position of the first camera by which the at least two images have been acquired and the information on each time at which the at least two images are acquired, wherein, in the first identification processing, the management server is further configured to:
when it is determined that the user associated with the user terminal is included in the image of the first range, determine whether information on a moving direction of the user is calculated; and
when it is determined that the information on the moving direction has been calculated, add the identification information on the second camera located ahead of the first camera by which the image of the first range in the moving direction has been acquired to the tracking support information based on the information on the moving direction, wherein, in the second identification processing, the management server is further configured to:
determine whether the identification information on the second camera located ahead in the moving direction is included in the tracking support information; and
when it is determined that the identification information on the second camera located ahead in the moving direction is included in the tracking support information, narrow down the person included in the image of the second range based on the identification information on the second camera.

9. A non-transitory computer readable medium that is configured to cause a computer to execute process to identify a person included in a camera image, the process including:
acquiring user information assigned to a user terminal through short-range wireless communication using an antenna, and transmitting the user information to an outside through long-range communication using the antenna;
acquiring an image of a first range including at least a part of a range of the short-range wireless communication by the antenna by using a first camera;
acquiring an image of a second range that does not include the range of the short-range wireless communication using a second camera;
identifying a person included in the image of first range; and
identifying a person included in the image of second range, wherein the processing to identify the person included in the image of the first range includes:
generating recognition information on the person included in the image of the first range;
determining whether a user associated with the user terminal is included in the image of the first range based on the recognition information on the person included in the image of the first range, the identification information on the antenna, and the user information acquired by the antenna; and
when it is determined that the user associated with the user terminal is included in the image of the first range, generating tracking support information on the user, wherein the processing to identify the person included in the image of the second range includes:
generating recognition information on the person included in the image of the second range; and
determining whether the same user as the user determined to be included in the image of the first range is included in the image of the second range based on the recognition information on the person included in the image of the second range and the tracking support information, without using the user information acquired from the antenna.

* * * * *